US006718838B2

United States Patent
Joyce et al.

(10) Patent No.: US 6,718,838 B2
(45) Date of Patent: Apr. 13, 2004

(54) ROTARY DRIVE MECHANISM AND APPLIANCE TIMER/SEQUENCE SWITCH UTILIZING SAME

(75) Inventors: Ronald S. Joyce, Elk Grove Village, IL (US); Sudha Narayanan, Woodbridge, NJ (US); Robert Van Der Linde, Carol Stream, IL (US); Lawrence T. Olges, Louisville, KY (US)

(73) Assignee: Ranco Incorporated of Delaware, Wilmington, DE (US)

( * ) Notice: Subject to any disclaimer, the term of this patent is extended or adjusted under 35 U.S.C. 154(b) by 0 days.

(21) Appl. No.: 09/871,005

(22) Filed: May 31, 2001

(65) Prior Publication Data

US 2002/0178849 A1 Dec. 5, 2002

(51) Int. Cl.⁷ .......................... F16H 21/44; F16H 25/12
(52) U.S. Cl. .............................. 74/107; 74/22 R; 74/96; 74/56; 134/58 D; 200/38
(58) Field of Search .................. 74/22 R, 22 A, 74/23, 25, 96, 98, 97.1, 97.2, 99 R, 107, 568 T, 54, 56, 53, 55, 413, 567, 435, 439, 440, 448, 557; 384/315, 322, 615, 622; 200/38, 38 R; 134/58 D

(56) References Cited

U.S. PATENT DOCUMENTS

| | | | | |
|---|---|---|---|---|
| 394,585 A | * | 12/1888 | Lester ............................ 74/54 |
| 402,018 A | * | 4/1889 | Hunt ............................ 74/54 |
| 2,913,048 A | * | 11/1959 | Laviana .................... 200/38 R |
| 2,923,164 A | * | 2/1960 | Walsh ........................... 74/54 |
| 3,626,133 A | | 12/1971 | Teruzzi .................... 200/168 R |
| 4,037,489 A | | 7/1977 | Morel ......................... 74/548 |
| 4,149,046 A | | 4/1979 | Bolin ........................... 200/38 |
| 4,183,251 A | * | 1/1980 | Testemale .................. 74/25 X |
| 4,355,921 A | | 10/1982 | Rousseau .................... 403/316 |
| 4,412,110 A | | 10/1983 | Wojtanek ..................... 200/38 |
| 4,796,484 A | | 1/1989 | Eder ............................. 74/568 |
| 4,892,982 A | | 1/1990 | Hueber et al. ............... 200/38 |
| 4,948,928 A | | 8/1990 | Willigman .................... 200/38 |
| 4,958,559 A | * | 9/1990 | Bubley et al. ............... 101/123 |
| 5,032,698 A | | 7/1991 | Satoh .......................... 200/341 |
| 5,059,754 A | | 10/1991 | Kaichi et al. ............. 200/332.1 |
| 5,220,542 A | | 6/1993 | Zink et al. ................... 368/107 |
| 5,310,090 A | * | 5/1994 | Taylor, Jr. ................. 134/58 D |
| 5,385,062 A | * | 1/1995 | Menke ........................... 74/54 |
| 5,601,491 A | | 2/1997 | Chan et al. .................... 464/37 |
| 5,603,431 A | * | 2/1997 | Tuller ........................ 134/58 D |
| 5,652,418 A | | 7/1997 | Amonett ........................ 200/38 |
| 5,652,419 A | | 7/1997 | Amonett et al. .............. 200/38 |
| 5,684,281 A | | 11/1997 | Amonett ....................... 200/38 |
| 5,689,096 A | | 11/1997 | Weaver et al. ................. 200/38 |
| 5,739,490 A | | 4/1998 | Amonett et al. .............. 200/38 |
| 5,750,948 A | | 5/1998 | Amonett et al. .............. 200/38 |
| 5,764,010 A | * | 6/1998 | Maue et al. .................. 318/443 |
| 5,780,791 A | | 7/1998 | Cole ............................. 200/38 |
| 5,814,776 A | | 9/1998 | Worley ......................... 200/38 |
| 5,828,019 A | | 10/1998 | Joyce ........................... 200/38 |
| 5,834,718 A | | 11/1998 | Amonett ....................... 200/38 |
| 5,861,590 A | | 1/1999 | Amonett ....................... 200/38 |
| 5,910,649 A | | 6/1999 | Amonett et al. .............. 200/38 |
| 5,929,403 A | | 7/1999 | Amonett et al. .............. 200/38 |

FOREIGN PATENT DOCUMENTS

SU 129142 * 7/1969 ................. 74/54

* cited by examiner

Primary Examiner—David A. Bucci
Assistant Examiner—Colby Hansen
(74) Attorney, Agent, or Firm—Leydig, Voit & Mayer, Ltd

(57) ABSTRACT

A rotary drive mechanism for use with a timer/sequence switch in an appliance is presented. The mechanism converts linear motion from a cam tracker following a programmed cam track to rotary motion to drive a vent damper in an appliance. The rotary motion output is derived as a multiple of the input linear motion through a gear set. This input linear motion is translated to rotary motion imparted to a tracking rod, which is coupled through the gear set to an output actuating rod. Tracking by a tracking lobe is accommodated by a spring bias force applied though a bias lobe that counteracts the force applied by the cam track. Alternatively, tracking by a tracker is accommodated by a spring bias force applied through a torque arm of the tracking rod that also counteracts the force applied by the cam track.

22 Claims, 6 Drawing Sheets

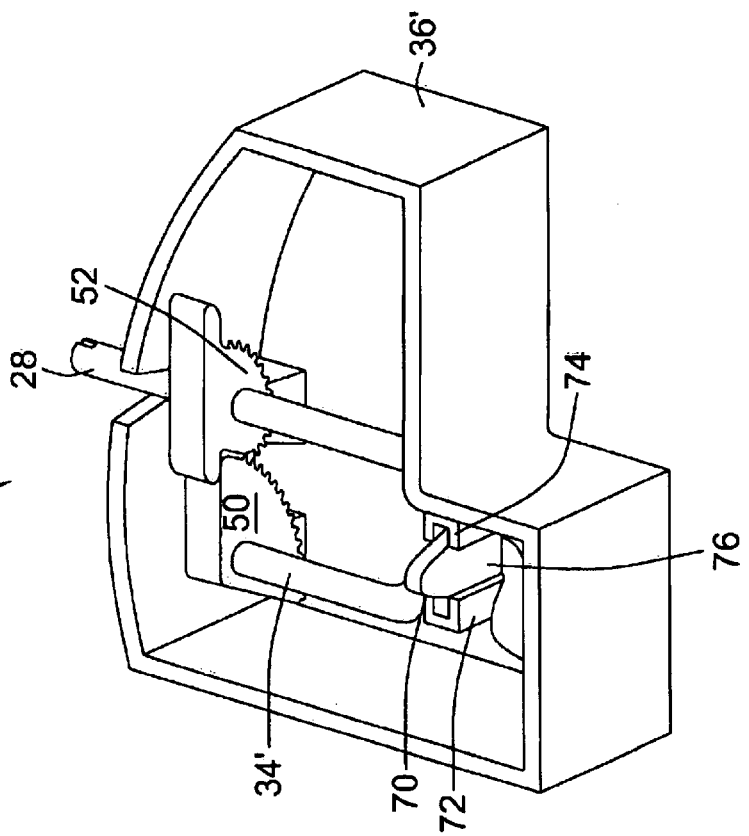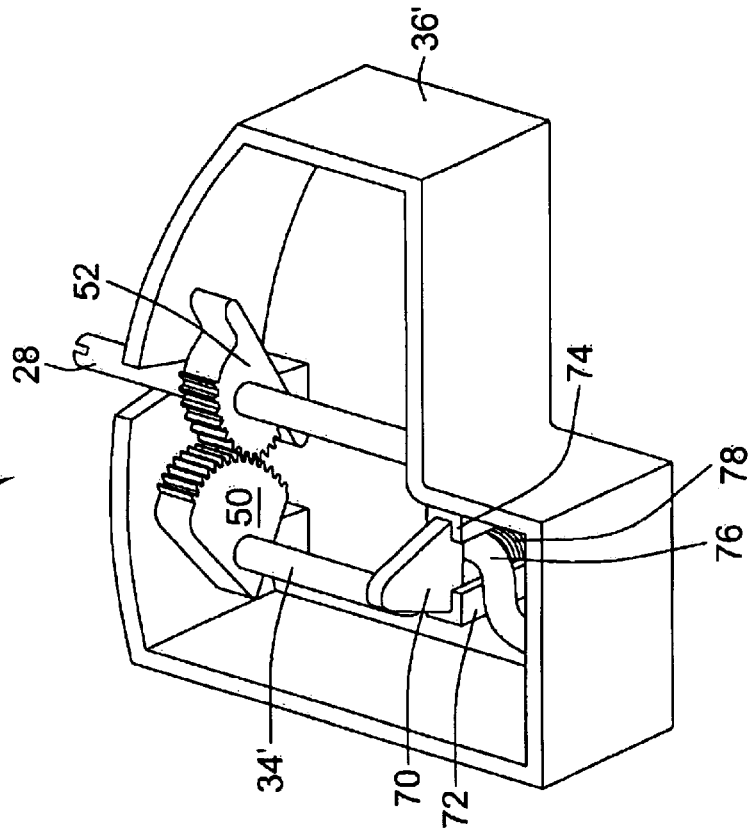

ROTARY DRIVE MECHANISM AND APPLIANCE TIMER/SEQUENCE SWITCH UTILIZING SAME

FIELD OF THE INVENTION

The present invention relates generally to appliance control mechanisms, and more particularly to damper drive mechanisms and timer/sequence switch control mechanisms used for appliances.

BACKGROUND OF THE INVENTION

Consumer and commercial appliances, such as dishwashers, washing machines, dryers, etc., typically operate under control of a sequenced program that controls the duration and number of cycles through which the appliance runs to accomplish the selected program. Heretofore, electromechanical program timers have been employed for such appliances wherein a rotary cam is periodically advanced or indexed by a timed advance mechanism for affecting sequential actuation and deactuation of a plurality of machine or appliance function control switches. In such typical known electromechanical program timer arrangements, one full revolution of the cam comprises a complete program interval or cycle for the machine or appliance.

Because the timing accuracy and number of switch actuations and deactuations controllable in a given program interval is limited by the available circumference of the cam, which in turn is limited by the size or volume of the program timer, many modern appliances have replaced the electromechanical program timer with a switch sequence controller. These more modern switch sequence controllers utilize programmable electronics to drive a motorized advance connected to a cam to position the switch cam to a desired position at a desired time rather than to continuously advance or periodically index a program cam through a revolution of rotary movement for the program cycle. These more modern hybrid programmers use electronics to control the cam advance motor for intermittent operation to achieve the desired sequence of switch operation instead of progressively advancing a program cam at a fixed rate and relying on the program cam profile to achieve the desired sequencing of the function control switches. As a result, the hybrid programmer provides the sophistication of electronic program control, yet retains the robustness of mechanically actuated electrical switching contacts which is required for switching relatively high current loads repeatedly over prolonged service. One such sequencing switch for use in a hybrid programmer is described in U.S. Pat. No. 5,828,019, entitled Motorized Sequencing Switch Assembly, issued Oct. 27, 1998, and assigned to the Assignee of the present application the teachings and disclosure of which are hereby incorporated in their entireties by reference thereto.

As one of the components typically controlled by the program sequencing operation of the typical electromechanical program timer or the more modern hybrid programmer, many appliances include at least one vent with a controlled damper to open and close the vent. For example, modern dishwashers typically include a damper controlled vent that is opened during a drying cycle to vent the cleaning tub area, and that is closed during the washing cycle to preserve the energy within the tub and to reduce the amount of noise that escapes therefrom. In conventional appliance design, these damper controlled vents comprise a drive motor coupled to the damper through a worm gear. When the program timer or hybrid programmer determines that it is time to open the damper on the vent, an electrical contact to the motor is closed which energizes the motor and begins rotation of the worm gear in a direction to open the vent. When the program timer or hybrid programmer determines that it is time to close the vent, an electrical contact is closed to energize the motor to rotate the worm gear in the opposite direction to close the damper on the vent. While this configuration performs well, the increased cost and energy usage of the damper drive motor is undesirable. There exists, therefore, a desire in the art to reduce the cost and energy consumption necessitated by controlled damper operation in consumer and commercial appliances and other machines.

BRIEF SUMMARY OF THE INVENTION

In view of the above, it is an object of the present invention to provide a new and improved rotary drive mechanism, timer sequence switch, and appliance that overcomes the above identified and other problems existing in the art.

In one embodiment of the present invention, a rotary drive mechanism operative in association with a rotary cam having a control track is presented. The rotary drive mechanism translates linear motion of the control track to rotary motion. This rotary drive mechanism comprises a housing, and a tracking rod rotatably secured within the housing. The tracking rod has a tracking lobe adapted to engage the control track of the rotary cam, and a tracking gear. The mechanism also includes an actuating rod rotatably secured within the housing and a driving end extending through the housing. This actuating rod also includes an actuating gear positioned to drivably engage the tracking gear. Rotation of the tracking rod though a first angle causes rotation of the actuating rod though a second angle determined by a gear ratio between the tracking gear and the actuating gear. Preferably, the gear ratio is approximately 2:1 resulting in an approximately 180° rotation of the actuating rod upon an approximately 90° rotation of the tracking rod. In one embodiment, the mechanism further comprises a torsion spring drivably coupled to the actuating rod external to the housing.

In a preferred embodiment, the tracking rod further includes a bias lobe oriented in an angular relationship to the tracking lobe. In this embodiment, the mechanism further comprises a bias spring affixed in the housing, and imparting a bias force on the bias lobe. This force positions the tracking lobe in a quiescent position absent interference from the control track. Preferably, the bias spring comprises a leaf spring having a first end affixed to the housing and a second end extending toward the bias lobe. This leaf spring defines a contact slide surface from the first end to the second end. The bias lobe slides along this contact slide surface under the bias force to return the tracking lobe to the quiescent position absent interference from the control track. In a further preferred embodiment, the tracking gear comprises an arc segment gear traversing approximately 90° and having a first and a second radial side. The housing also includes a tracking gear stop positioned to contact the first radial side when the tracking lobe is in the quiescent position. Preferably, the actuating gear includes a first and a second locating lobe extending radially from the actuating gear. In one embodiment, the second locating lobe contacts the second radial side in the quiescent position, and the first locating lobe contacts the first radial side when the tracking gear is rotated to an activated position.

In an alternate embodiment of the present invention, a rotary drive mechanism adapted to translate linear rise and fall motion of a cam control track to rotary motion comprises a housing, a tracking rod rotatably fixed in the housing, and means for tracking the cam control track. This tracking means imparts rotary motion to the tracking rod in response to the linear rise and fall of the cam control track. The mechanism also includes an actuating rod rotatably fixed in the housing having an end extending though the housing, and rotary motion multiplying means operatively attached to the tracking rod and to the actuating rod. This means transmits rotary motion from the tracking rod to the actuating rod. The rotary motion imparted to the actuating rod is a multiple of the rotary motion of the tracking rod.

In one embodiment, the tracking means comprises a tracking lobe extending from the tracking rod. Preferably, the tracking means further comprises a bias lobe extending from the tracking rod in an angular relationship to the tracking lobe, and a bias spring imparting a bias force on the bias lobe. This bias force acts in opposition to a force applied to the tracking lobe by the rise in the cam control track, which enables the tracking lobe to track the falls in the cam control track. Alternatively, the tracking means comprises a torque arm extending from the tracking rod, and a tracker linearly movable within the housing and in communication with the torque arm. Linear movement of the tracker imparts rotary motion to the tracking rod though the torque arm. Preferably, the tracking means further comprises a bias spring imparting a bias force on the torque arm acting in opposition to a force applied to the torque arm by the tracker, which enables the tracker to track the falls in the cam control track.

In a preferred embodiment, the rotary motion multiplying means comprises a tracking gear operatively attached to the tracking rod, and an actuating gear operatively attached to the actuating rod. This actuating gear is positioned to drivably engage the tracking gear. The multiple of the rotary motion of the tracking rod imparted to the actuating rod is determined by a gear ration between the actuating gear and the tracking gear. Preferably, the tracking gear comprises an arc segment gear traversing approximately 90° and having a first and a second radial side. The actuating gear includes a first and a second locating lobe extending radially from the gear. The second locating lobe contacts the second radial side when the means for tracking the cam control track is tracking a fall in the cam control track. The first locating lobe contacts the first radial side when the means for tracking the cam control track is tracking a rise in the cam control track.

In a further alternate embodiment, an appliance timer/sequence switch providing a program-controlled rotary output is presented. This timer/sequence switch comprises a motor having an output shaft, a cam drivably coupled to the output shaft and having at least one cam control track on its surface, and a rotary drive mechanism. This rotary drive mechanism has a cam control track follower adapted to linearly follow the cam control track, and an output actuating rod providing rotary motion corresponding to linear deviations of the cam control track. The rotary drive mechanism further comprises a tracking rod drivably coupled to the cam control track follower. This tracking rod is rotated by the cam control track follower during the linear deviations of the cam control track. The tracking rod rotatably drives the actuating rod though a gear set having an input to output ratio multiplying rotary motion of the tracking rod to the actuating rod.

In one embodiment of the timer/sequence switch, the cam control track follower comprises a tracking lobe extending from the tracking rod, a bias lobe extending from the tracking rod in an angular relationship to the tracking lobe, and a bias spring imparting a bias force on the bias lobe to maintain the cam control track follower in contact with the cam control track. In an alternate embodiment, the cam control track follower comprises a torque arm extending from the tracking rod, and a tracker linearly movable within the rotary drive mechanism and in communication with the torque arm. Linear movement of the tracker imparts rotary motion to the tracking rod though the torque arm. The cam control track follower further comprises a bias spring imparting a bias force on the torque arm acting in opposition to a force applied to the torque arm by the tracker. This enables the tracker to maintain contact with the cam control track.

A further embodiment of the present invention presents an appliance comprising a vent having a damper rotatable between an opened and a closed position, and a program timer operative to control operating cycles of the appliance. This program timer includes a motor driven cam having a vent control track on its surface. The appliance also includes a rotary drive mechanism having a vent control track follower adapted to follow the vent control track. The rotary drive mechanism further includes an output actuating rod providing rotary motion corresponding to vent control track. A torsional actuator is drivably coupled between the output actuating rod and the damper. Preferably, the torsional actuator comprises a torsion spring.

In one embodiment of the appliance, the rotary drive mechanism further comprises a tracking rod drivably coupled to the vent control track follower. This tracking rod is rotated by the vent control track follower during linear deviations of the vent control track, and rotatably drives the output actuating rod though a gear assembly. The gear assembly has a gear ratio though which rotary motion of the tracking rod is multiplied to the actuating rod. Preferably, the vent control track follower comprises a tracking lobe extending from the tracking rod, a bias lobe extending from the tracking rod in an angular relationship to the tracking lobe, and a bias spring imparting a bias force on the bias lobe to maintain the vent control track follower in contact with the vent control track. Alternatively, the vent control track follower comprises a torque arm extending from the tracking rod, and a tracker linearly movable within the rotary drive mechanism and in communication with the torque arm. In this embodiment, linear movement of the tracker imparts rotary motion to the tracking rod though the torque arm. The vent control track follower further comprises a bias spring imparting a bias force on the torque arm acting in opposition to a force applied to the torque arm by the tracker thereby enabling the tracker to maintain contact with the cam control track.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 7 is an isometric illustration of an alternate embodiment of a rotary drive mechanism in accordance with the present invention illustrated in a quiescent position; and FIG. 8 is an isometric illustration of an alternate embodiment of a rotary drive mechanism in accordance with the present invention illustrated in an actuated position.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
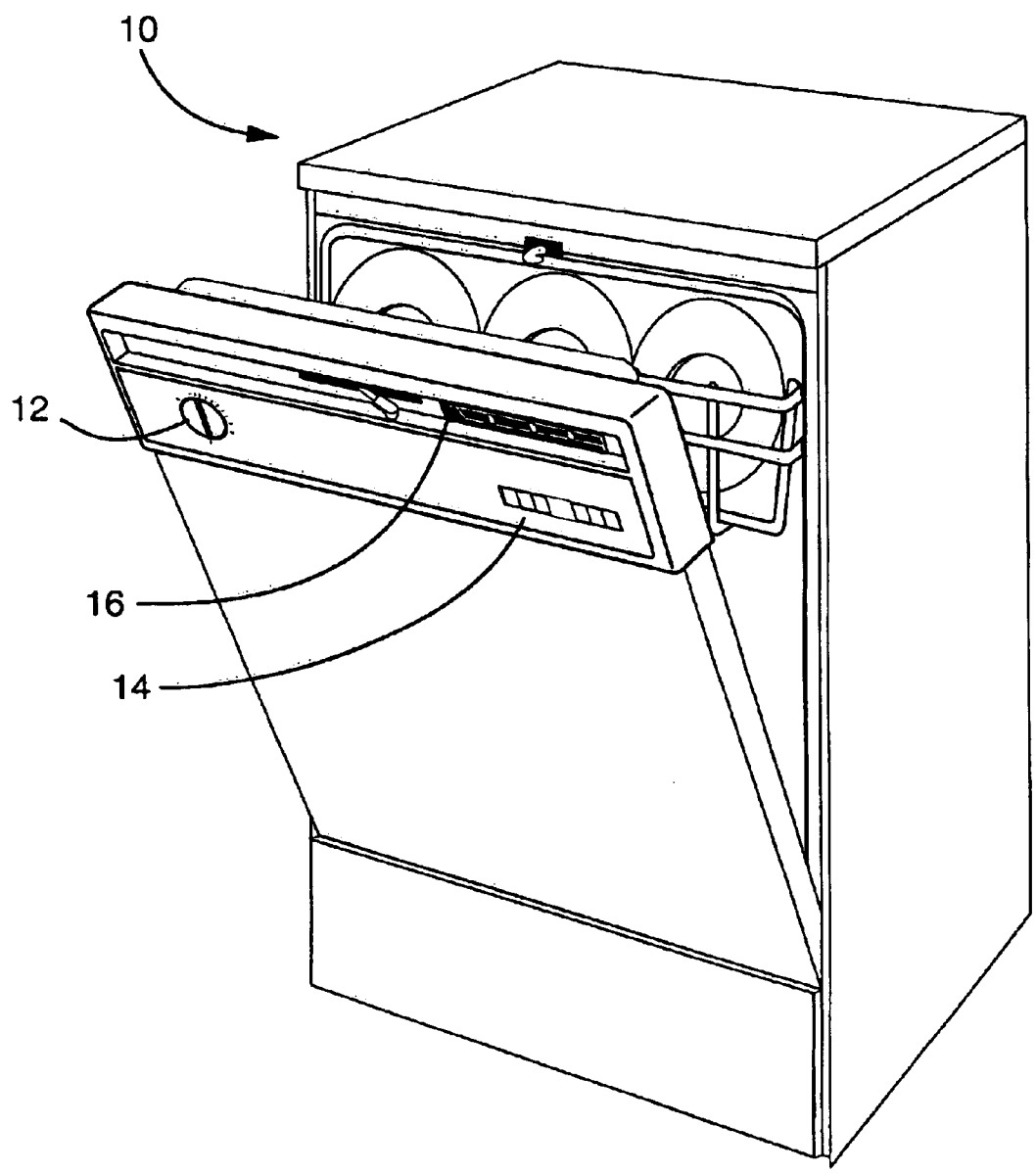
FIG. 1 is a simplified isometric view of a consumer appliance constructed in accordance with the teachings of the present invention.

A consumer appliance constructed in accordance with the present invention, such as the dishwasher 10 illustrated in FIG. 1, includes a user interface 12 through which a user may select and control the various functions and cycles available with the appliance 10. While the appliance 10 of FIG. 1 is illustrated with a rotary control knob 12, one skilled in the art will recognize that an electronic control panel 14 may also or alternatively be included in the appliance 10, particularly if the control mechanism is a hybrid programmer that includes a sequence switch as discussed above.

An appliance constructed in accordance with the teachings of the present invention also includes at least one damper controlled vent 16, which is opened and closed in the various cycles as required by the controller. In the exemplary appliance 10 illustrated in FIG. 1, the vent 16 is a door vent that provides venting of the interior dishwashing cavity during a drying cycle. This vent 16 is closed during the typical rinse, pre-wash, soak, wash, etc. cycles to maintain the heat energy within the cavity, and to reduce the ambient noise released by the appliance. Once these noise producing cycles are complete, the appliance control commands this vent 16 opened so that excess moisture may escape the dishwashing cavity and aid in the drying and cooling of the dishes therein.

Figure 2:
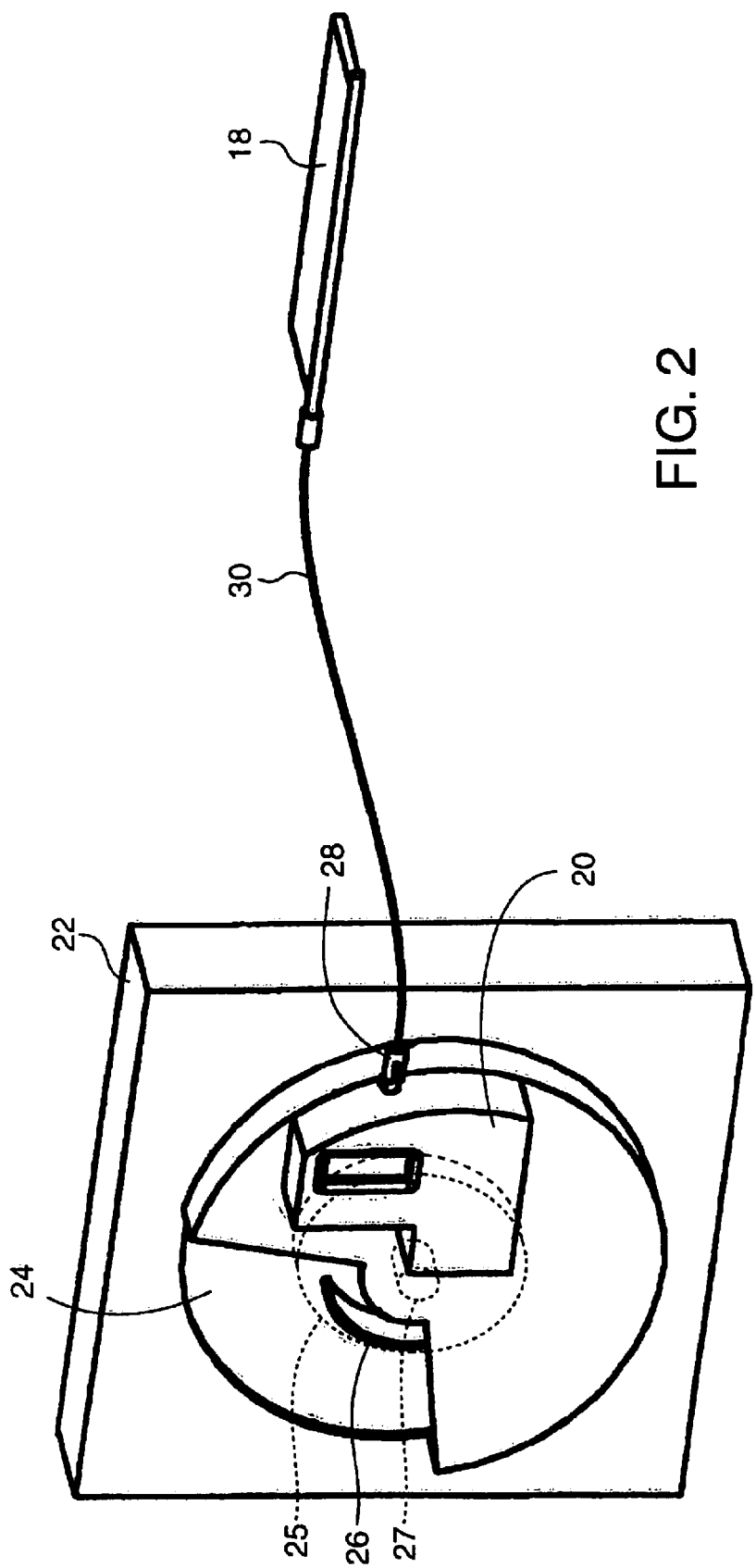
FIG. 2 is a simplified partial cut-away view of a program timer/sequence switch including an auxiliary rotary drive driving a vent damper in accordance with an embodiment of the present invention.

As illustrated in FIG. 2, control of the vent damper 18 is accomplished by rotary drive mechanism 20 that operates in association with the electromechanical program timer/sequence switch 22 that controls the program cycles of the appliance. Specifically, a cam 24 driven by the output shaft 27 of a motor 25 within the timer/sequence switch 22 includes a vent control track 26 thereon. As the cam 24 rotates with the timer/sequence switch 22, the rotary drive mechanism 20 translates the linear rise and fall of the vent control track 26 into a rotary output on the actuating rod 28. This actuating rod is coupled to the vent damper 18 through a torsional actuator 30. This torsional actuator 30 may take the form of a torsion spring comprising preferably a spring steel wire that is attached to the output of the actuating rod 28.

A unique feature of the present invention is that the torque transmitted is not affected by small deflections of the torsional actuator 30, enabling it to be routed around obstructions within the interior of the appliance without affecting the ability to reliably operate the vent damper 18. This presents a significant advantage because different types of appliances, and different models within each type of appliance often utilize damper controlled vents in locations that are not proximate to the control mechanism location. Often, the damper controlled vent is located in a hostile environment of high humidity, high heat, or low temperature which is not conducive to the proper operation of the control mechanism. However, with the control system of the present invention, the rotary output from the rotary drive mechanism 20 may be communicated to the vent damper 18 by use of the spring steel wire 30 without concern for the disparate location of these two end devices.

In one embodiment of the present invention, the rotary drive mechanism 20 converts the linear rising and falling profile of the vent control track 26 into rotary motion by providing a means for tracking the vent control track 26 of cam 24. In the embodiment illustrated in FIG. 3, the means for tracking the vent control track includes a tracking lobe 32 that extends from a tracking rod 34 rotatably secured within the housing 36 of the rotary drive mechanism 20. The proper tracking of the vent control track by the tracking lobe 32 is aided by a bias lobe 38 that extends from the tracking rod 34 in an angular relationship to the tracking lobe 32. A bias spring 40 applies a force to the bias lobe 38 that counteracts the force applied to the tracking lobe 32 so that this tracking lobe 32 may properly track the rises and falls of the vent control track. In this embodiment illustrated in FIG. 3, the bias spring 40 takes the form of a leaf spring having one end 42 secured to the housing 36, and allowing the other end 44 to extend away from the housing 36 to apply the bias force on the bias lobe 38. In this embodiment, the leaf spring 40 has a contact slide surface 46 on which the bias lobe 38 slides as the tracking lobe 32 is displaced from its quiescent position illustrated in FIG. 3 by raised portions of the vent control track.

Figure 3:
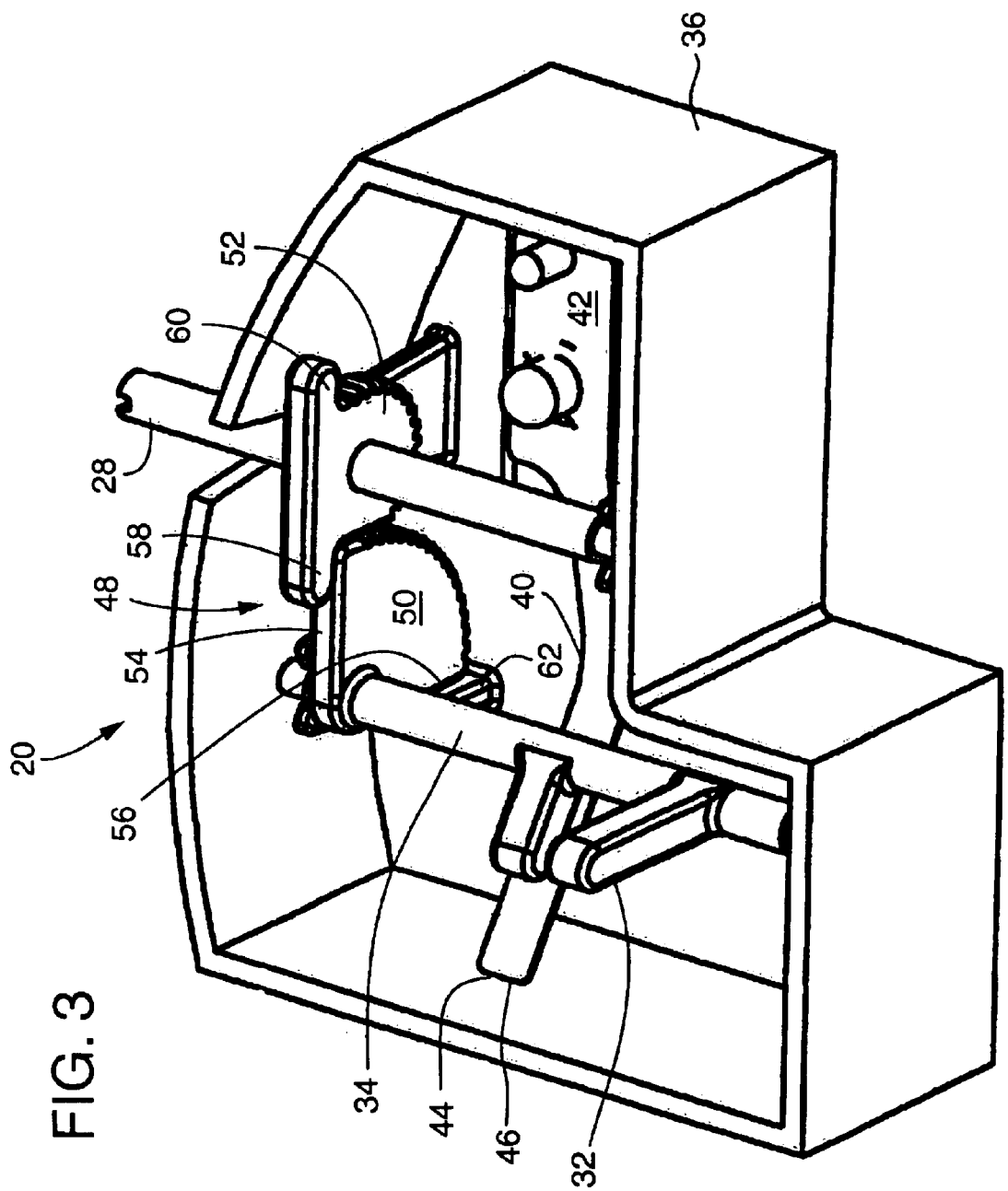
FIG. 3 is an isometric illustration of the rotary drive mechanism of the present invention in a quiescent position.

As the tracking lobe 32 is displaced from its quiescent position by raised portions of the vent or cam control track, the tracking rod 34 is rotated in a counterclockwise direction in FIG. 3. The tracking rod 34 is then rotated and in a clockwise direction when the tracking lobe 32 is allowed to return to its quiescent position as lowered areas of the cam control track are encountered. This rotary motion is transmitted to the actuating rod 28 through a means for multiplying this rotary motion, illustrated in FIG. 3 as gear set 48. In the embodiment illustrated, this gear set 48 comprises a tracking gear 50 and an actuating gear 52. Since, in the embodiment illustrated in FIG. 3, the tracking lobe 32 may not be displaced more than 90° by action of the vent control track, tracking gear 50 is preferably an arc segment gear traversing approximately 90°. In this form, the arc segment gear 50 includes two radial sides 54, 56 that are operative to ensure proper assembly and operation of the rotary drive mechanism 20. The proper assembly of the drive mechanism 20 is furthered aided by the actuating gear 52, which preferably includes two locating lobes 58, 60. In its quiescent state, the locating lobe 58 of actuating gear 52 preferably contacts the radial side 54 of the arc segment gear 50. The proper assembly of the rotary drive mechanism 20 is also ensured by a tracking gear stop 62 which contacts the other radial side 56 of the arc segment gear 50 in this quiescent state.

Figure 4:
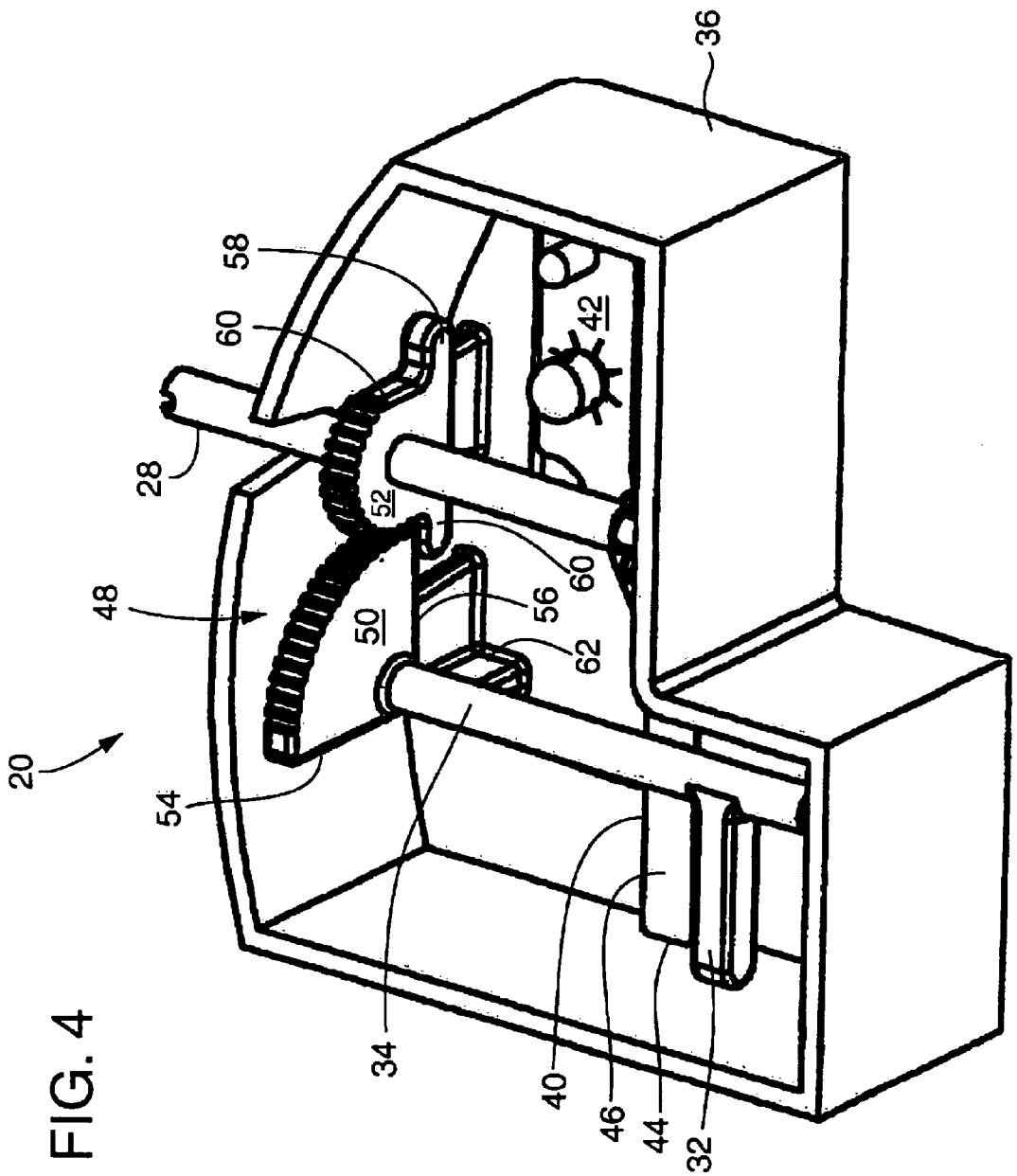
FIG. 4 is an isometric illustration of the rotary drive mechanism illustrated in FIG. 3 in an actuated position.

As the tracking lobe 32 is displaced from its quiescent position by the raised portions of the vent control track, the tracking rod 34 and the actuating rod 28 are rotated by action of gears 50, 52 into the position shown in FIG. 4. As may be seen from this FIG. 4, the tracking lobe 32 is now in a fully actuated position, displaced approximately 90° from its quiescent position. Because of the gear ratio between the arc segment gear 50 and the actuating gear 52, the approximate 90° rotation of the tracking rod 34 has resulted in an approximately 180° rotation of the actuating rod 28. As will now be recognized by those skilled in the art, the amount of rotation experienced by the actuating rod 28 may be directly controlled by the gear ratio such that the rotation of the tracking rod may be multiplied by this ratio to generate the desired output rotary motion. This rotary motion may be geared up or down, resulting in greater or lesser angular rotation of the actuating rod 28 based on a given angular rotation of the actuating rod 34. As may also be seen in this FIG. 4, the bias lobe (not visible) has been rotated against the bias spring 40 by the action of the cam track displacing the tracking lobe 32. As lowered portions on the cam track are encountered, the bias force from spring 40 will cause the clockwise rotation of the tracking shaft 34 to force the tracking lobe 32 to properly follow the vent control track on the cam. In this fully actuated position the locating lobe 60 of the actuating gear 52 contacts the other radial side 56 of the arc segment gear 50.

Figure 5:
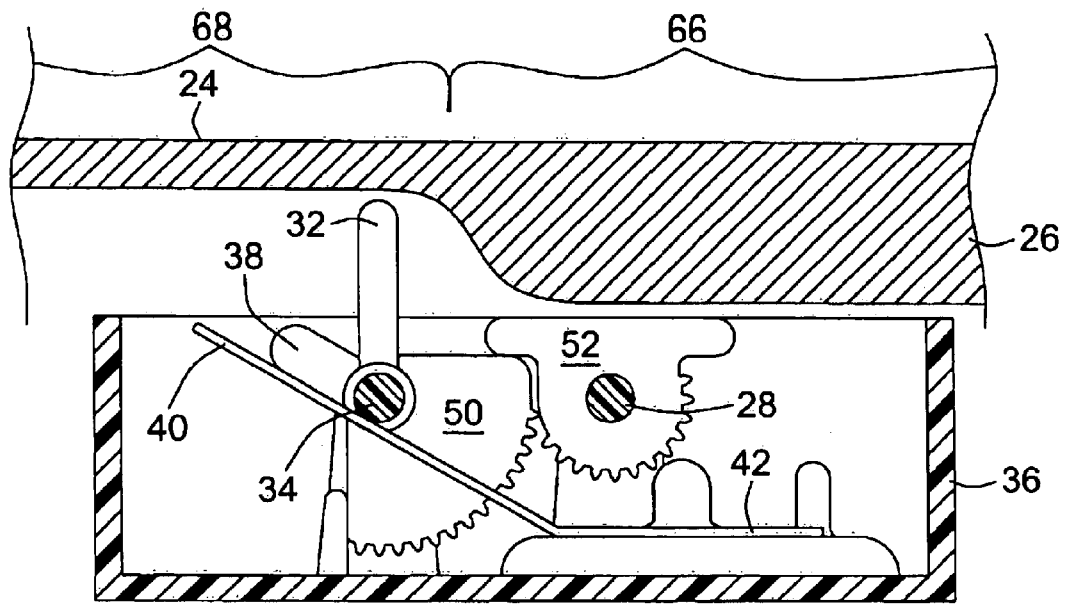
FIG. 5 is a cut-away end view illustration of the rotary drive mechanism illustrated in FIG. 3 in a quiescent position.
Figure 6:
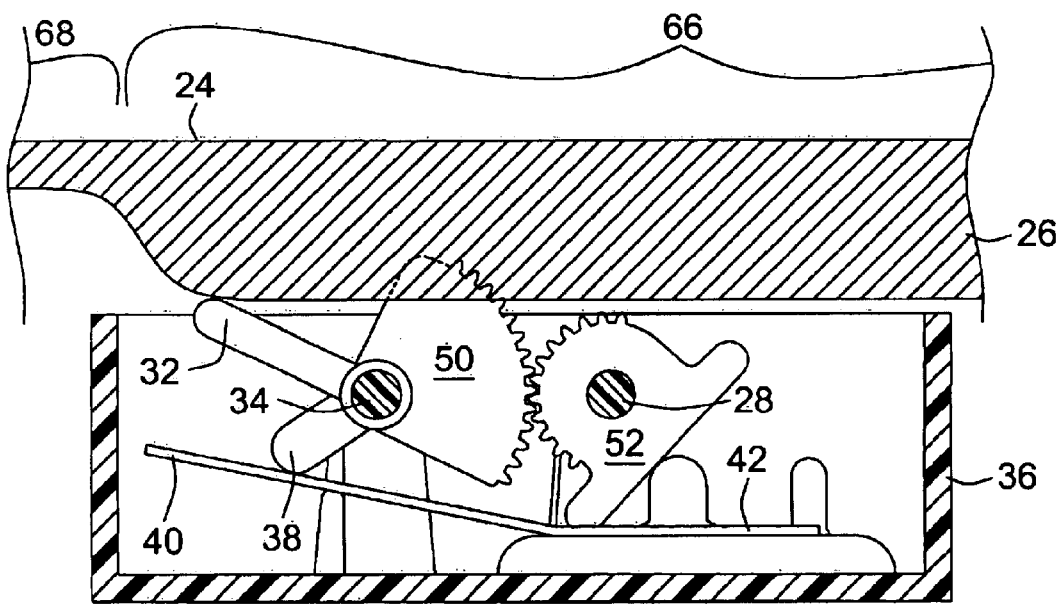
FIG. 6 is a cut-away end view illustration of the rotary drive mechanism illustrated in FIG. 3 in an actuated position.

Operation of the rotary drive mechanism 20 of the present invention may be better understood with reference to FIG. 5. As may be seen in this end cross-section, the cam 24 includes a cam or vent control track 26 having raised portions indicated by area 66 and lowered portions indicated by area 68. As the cam 24 is rotated, the tracking lobe 32 remains in its quiescent position until a raised portion 66 is encountered. FIG. 6 illustrates this condition. As may be seen from this FIG. 6, the tracking lobe 32 has been displaced by the raised portion 66 of cam 24, resulting in a rotation of the arc segment gear 50 and the actuating gear 52. This imparts a rotary motion to the actuating rod 28 which, through the torsional actuator 30 (FIG. 2) transitions the vent damper 18 (FIG. 2). The tracking lobe 32 will again be transitioned to its quiescent position illustrated in FIG. 5 when another lowered section 68 of the cam track is encountered by the action of the bias spring 40 rotating the bias lobe 32 in a clockwise direction. This action ensures constant contact and proper tracking of the vent control track on the cam 24.

A unique feature of this design is that the output actuating rod 28 orientation is not affected by the bi-directional motion of cam 24 as long as transitions are not encountered on the vent track 26 between the raised 66 and lowered 68 portions. This feature enables the rotary drive mechanism of the present invention to be employed in control systems that utilize a sequence switch such as that described in U.S. Pat. No. 5,828,019, the teachings and disclosure of which are incorporated herein by reference. That is, when used in association with a sequence switch that allows the cam to be rotated in a reverse direction to, for example, re-run a wash cycle, the vent control track 26 in the region of the wash cycle control on the cam 24 does not include any transitions between raised 66 and lowered 68 areas. In other words, the vent damper is always either open or closed during the cycle to be re-run such that reverse rotation of the cam does not attempt to rotate the tracking lobe 32 in a clockwise direction as illustrated in FIGS. 5 and 6.

An alternate embodiment of the rotary drive mechanism 20' of the present invention is illustrated in FIG. 7. While the output actuating rod 28, actuating gear 52, and arc segment gear 50 remain unchanged from the previous embodiment, the housing 36' and the tracking rod 34' differ from the embodiment described above. Specifically, the means for tracking the cam control track comprises a tracker 70 that is linearly moveable within the housing 36' in tracker guides 72, 74. This tracking of the cam control track is further enabled by a torque arm 76 extending from the tracking rod 34'. This torque arm 76 is biased against the tracker 70 by a bias spring 78. This spring 78 applies a bias force that tends to rotate the torque arm 76 in a counterclockwise direction to oppose the displacement of tracker 70 by the cam control track on the cam.

As raised portions of the cam control track are encountered, the tracker 70 is forced in a downward direction in the orientation illustrated in FIG. 7 that results in a clockwise rotation of the tracking rod 34' and a compression of the bias spring 78. As lowered portions of the cam control track are encountered, the bias force from the bias spring 78 will force the torque arm 76 in an upward fashion in the orientation of FIG. 7 to thereby rotate the tracking rod 34' in a counterclockwise direction, and returning the tracker 70 to its quiescent position. One skilled in the art will recognize that while the embodiment illustrated in FIG. 7 utilizes a U-shaped portion of the tracking rod 34' to form the torque arm, other configurations may be utilized. For example, the torque arm may be formed from an L-shaped extension from tracking rod 34' having a portion positioned below tracker 70 to effectuate the operation described above.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A rotary drive mechanism operative in association with a rotary cam having a control track on a surface thereof for translating linear motion of the control track to rotary motion, comprising:

a housing;

a tracking rod rotatably secured within said housing, said tracking rod having a tracking lobe extending therefrom, said tracking lobe adapted to engage the control track of the rotary cam, said tracking rod further including a tracking gear; and an actuating rod rotatably secured within said housing and having a driving end extending though said housing, said actuating rod including an actuating gear positioned to drivably engage said tracking gear; and wherein rotation of said tracking rod though a first angle causes rotation of said actuating rod though a second angle determined by a gear ratio between said tracking gear and said actuating gear.

2. The mechanism of claim 1, wherein said tracking rod further includes a bias lobe oriented in an angular relationship to said tracking lobe, said mechanism further comprising a bias spring affixed in said housing, said bias spring imparting a bias force on said bias lobe to position said tracking lobe in a quiescent position absent interference from the control track.

3. The mechanism of claim 2, wherein said bias spring comprises a leaf spring having a first end affixed to said housing and a second end extending toward said bias lobe, said leaf spring defining a contact slide surface from said first end to said second end, and wherein said bias lobe slides along said contact slide surface under said bias force to return said tracking lobe to said quiescent position absent interference from the control track.

4. The mechanism of claim 2, wherein said tracking gear comprises an arc segment gear traversing approximately 90°, said arc segment gear having a first and a second radial side, and wherein said housing includes a tracking gear stop positioned to contact said first radial side when said tracking lobe is in said quiescent position.

5. The mechanism of claim 4, wherein said actuating gear includes a first and a second locating lobe extending radially therefrom, said second locating lobe contacting said second radial side in said quiescent position, and said first locating lobe contacting said first radial side when said tracking gear is rotated to an activated position.

6. The mechanism of claim 1, wherein said gear ratio is approximately 2:1 resulting in an approximately 180° rotation of said actuating rod upon an approximately 90° rotation of said tracking rod.

7. The mechanism of claim 1, further comprising a torsion spring drivably coupled to said actuating rod external to said housing, said torsion spring adapted to translate rotational motion of said actuating rod to an external device to be driven thereby.

8. A rotary drive mechanism adapted to translate linear rise and fall motion of a cam control track to rotary motion, comprising:
 a housing;
 a tracking rod rotatably fixed in said housing;
 means for tracking the cam control track, said tracking means imparting rotary motion to said tracking rod in response to the linear rise and fall of the cam control track;
 an actuating rod rotatably fixed in said housing and having an end thereof extending though said housing;
 rotary motion multiplying means operatively attached to said tracking rod and to said actuating rod for transmitting rotary motion from said tracking rod to said actuating rod, said rotary motion imparted to said actuating rod being a multiple of said rotary motion of said tracking rod.

9. The mechanism of claim 8, wherein said tracking means comprises a tracking lobe extending from said tracking rod.

10. The mechanism of claim 9, wherein said tracking means further comprises a bias lobe extending from said tracking rod in an angular relationship to said tracking lobe, and a bias spring imparting a bias force on said bias lobe acting in opposition to a force applied to said tracking lobe by the rise in the cam control track thereby enabling said tracking lobe to track the falls in the cam control track.

11. The mechanism of claim 8, wherein said tracking means comprises a torque arm extending from said tracking rod, and a tracker linearly movable within said housing and in communication with said torque arm, and wherein linear movement of said tracker imparts rotary motion to said tracking rod though said torque arm.

12. The mechanism of claim 11, wherein said tracking means further comprises a bias spring imparting a bias force on said torque arm acting in opposition to a force applied to said torque arm by the tracker thereby enabling said tracker to track the falls in the cam control track.

13. The mechanism of claim 8, wherein said rotary motion multiplying means comprises a tracking gear operatively attached to said tracking rod, and an actuating gear operatively attached to said actuating rod and positioned to drivably engage said tracking gear, and wherein said multiple of said rotary motion of said tracking rod imparted to said actuating rod is determined by a gear ration between said actuating gear and said tracking gear.

14. The mechanism of claim 13, wherein said tracking gear comprises an arc segment gear traversing approximately 90°, said arc segment gear having a first and a second radial side.

15. The mechanism of claim 14, wherein said actuating gear includes a first and a second locating lobe extending radially therefrom, said second locating lobe contacting said second radial side when said means for tracking the cam control track is tracking a fall in the cam control track, and said first locating lobe contacting said first radial side when said means for tracking the cam control track is tracking a rise in the cam control track.

16. An appliance timer/sequence switch providing a program-controlled rotary output, comprising:
 a motor having an output shaft;
 a cam drivably coupled to said output shaft, said cam having at least one cam control track on a surface thereof;
 a rotary drive mechanism having a cam control track follower adapted to linearly follow said cam control track, said rotary drive mechanism further having an output actuating rod providing rotary motion corresponding to linear deviations of said cam control track;
 wherein said rotary drive mechanism further comprises a tracking rod drivably coupled to said cam control track follower, said tracking rod being rotated by said cam control track follower during said linear deviations of said cam control track, said tracking rod rotatably driving said actuating rod though a gear set, said gear set having an input to output ratio multiplying rotary motion of said tracking rod to said actuating rod; and
 wherein said cam control track follower comprises a tracking lobe extending from said tracking rod, a bias lobe extending from said tracking rod in an angular relationship to said tracking lobe, and a bias spring imparting a bias force on said bias lobe to maintain said cam control track follower in contact with said cam control track.

17. An appliance timer/sequence switch providing a program-controlled rotary output, comprising:
 a motor having an output shaft;
 a cam drivably coupled to said output shaft, said cam having at least one cam control track on a surface thereof;
 a rotary drive mechanism having a cam control track follower adapted to linearly follow said cam control track, said rotary drive mechanism further having an output actuating rod providing rotary motion corresponding to linear deviations of said cam control track;
 wherein said rotary drive mechanism further comprises a tracking rod drivably coupled to said cam control track follower, said tracking rod being rotated by said cam control track follower during said linear deviations of said cam control track, said tracking rod rotatably driving said actuating rod though a gear set, said gear set having an input to output ratio multiplying rotary motion of said tracking rod to said actuating rod; and wherein said cam control track follower comprises a torque arm extending from said tracking rod, and a tracker linearly movable within said rotary drive mechanism and in communication with said torque arm, and wherein linear movement of said tracker imparts rotary motion to said tracking rod though said torque arm, and wherein said cam control track follower further comprises a bias spring imparting a bias force on said torque arm acting in opposition to a force applied to said torque arm by the tracker thereby enabling said tracker to maintain contact with said cam control track.

18. An appliance, comprising:

a vent having a damper rotatable between an opened and a closed position;

a program timer operative to control operating cycles of said appliance, said program timer including a motor drivably coupled to a cam having a vent control track on a surface thereof;

a rotary drive mechanism having a vent control track follower adapted to follow said vent control track, said rotary drive mechanism further having an output actuating rod providing rotary motion corresponding to vent control track; and a torsional actuator drivably coupled between said output actuating rod and said damper.

19. The appliance of claim 18, wherein said rotary drive mechanism further comprises a tracking rod drivably coupled to said vent control track follower, said tracking rod being rotated by said vent control track follower during linear deviations of said vent control track, said tracking rod rotatably driving said output actuating rod though a gear assembly, said gear assembly having a gear ratio though which rotary motion of said tracking rod is multiplied to said actuating rod.

20. The appliance of claim 19, wherein said vent control track follower comprises a tracking lobe extending from said tracking rod, a bias lobe extending from said tracking rod in an angular relationship to said tracking lobe, and a bias spring imparting a bias force on said bias lobe to maintain said vent control track follower in contact with said vent control track.

21. The mechanism of claim 19, wherein said vent control track follower comprises a torque arm extending from said tracking rod, and a tracker linearly movable within said rotary drive mechanism and in communication with said torque arm, and wherein linear movement of said tracker imparts rotary motion to said tracking rod though said torque arm, and wherein said vent control track follower further comprises a bias spring imparting a bias force on said torque arm acting in opposition to a force applied to said torque arm by the tracker thereby enabling said tracker to maintain contact with said cam control track.

22. The appliance of claim 18, wherein said torsional actuator comprises a torsion spring.

* * * * *